United States Patent [19]
Beretta et al.

[11] 3,909,274
[45] Sept. 30, 1975

[54] SILVER HALIDE EMULSION CONTAINING TRINUCLEAR RHODANINE NUCLEUS DYES SOLUBLE IN LOW-MOLECULAR WEIGHT ALCOHOLS

[75] Inventors: Paolo Beretta, Ferrania; Luigi Magnani, Carcare, both of Italy

[73] Assignee: Minnesota Mining and Manufacturing Company, St. Paul, Minn.

[22] Filed: Jan. 2, 1973

[21] Appl. No.: 320,575

[30] Foreign Application Priority Data
Jan. 4, 1972  Italy.................................. 47546/72

[52] U.S. Cl.............................. 96/127; 260/240.1
[51] Int. Cl.² ........................................... G03C 1/10
[58] Field of Search...................... 96/127, 137, 139

[56] References Cited
UNITED STATES PATENTS

| | | | |
|---|---|---|---|
| 2,256,163 | 9/1941 | Kumetat et al. | 96/137 |
| 3,335,010 | 8/1967 | Taber at al. | 96/127 |
| 3,539,349 | 11/1970 | Brooker et al. | 96/139 |
| 3,734,739 | 5/1973 | Borror | 96/137 |
| 3,743,510 | 7/1973 | Nakazawa et al. | 96/127 |

*Primary Examiner*—J. Travis Brown
*Attorney, Agent, or Firm*—Alexander, Sell, Steldt & DeLaHunt

[57] ABSTRACT

Trinuclear dyes derived from the rhodanine nucleus are made soluble in low-molecular weight alcohols by the addition of a substituent to the nitrogen atom of the rhodanine central nucleus.

4 Claims, No Drawings

SILVER HALIDE EMULSION CONTAINING TRINUCLEAR RHODANINE NUCLEUS DYES SOLUBLE IN LOW-MOLECULAR WEIGHT ALCOHOLS

The present invention relates to a new method for rendering trinuclear dyes derived from the rhodanine nucleus soluble in low-molecular weight alcohols; to alcohol-soluble dyes whose solubility is obtained with the said method; to photographic emulsions containing such dyes and to photographic elements including such emulsions.

Trinuclear dyes derived from the rhodanine nucleus are described for instance in the German Pat. No. 1,098,553, in the U.S. Pat. No. 2,454,629 and in F. M. Hamer: "The Cyanine Dyes and Related Compounds" — Interscience Publishers — 1954, page 658 ff. Such publications describe trinuclear dyes derived from the rhodanine nucleus which bears a heterocyclic nucleus substituent linked in 2-position by means of a monomethyne bridge or a ketomethylene nucleus directly linked to the said 2-position and a second heterocyclic nucleus linked in 5-position directly or by means of a methyne bridge having an even number of carbon atoms.

It is well-known that such dyes are poorly soluble in low-molecular weight alcohols (such as methyl and ethyl alcohols), and that they are not water-soluble. These properties detract from their employment in general and particularly their use in silver halide photographic emulsions. The properties of photographic emulsion are in fact negatively affected by the presence of solvents different from alcohols, such as for instance dimethylsulphoxide, ethylenglycol, methylcellosolve, phenylcellosolve and benzyl alcohol. Excessive alcohol quantities are also harmful to the emulsions, especially when they contain couplers dispersed in water-immiscible high-boiling solvents, because they cause the floculation of the said couplers.

The invention described in U.S. Pat. No. 3,335,010 was an attempt to remove the drawbacks of the above-mentioned type. It relates to trinuclear dyes derived from the rhodanine nucleus containing at least one substituent of the dialkylaminoalkyl type, such dyes being soluble in an aqueous solution which contains an equivalent of a strong acid for a dye equivalent. Unfortunately, however, such dye solutions are not very stable.

According to the present invention it has been found that dyes which are soluble in low-molecular weight alcohols can be obtained by introducing, on the N atom of the rhodanine nucleus which forms the central nucleus of the trinuclear dyes, a substituent of the alkyl type substituted with a trialkylammonium group.

The dyes rendered soluble in alcohols according to the present invention are stable and particularly useful when introduced into silver halide photographic emulsions as optical sensitizers for the production of both black and white, and color photographic elements which give rise respectively to black and white, and colored images upon development, as well-known to the man skilled in the art.

Briefly, the present invention relates to a method for rendering a trinuclear dye soluble in a low-molecular weight alcohol, the said dye being constituted by:

a. a first rhodanine central nucleus group;
b. a second heterocyclic nucleus linked in 2-position to the said rhodanine nucleus by means of a monomethyne bridge or a ketomethylene nucleus directly linked in 2-position;
c. a third heterocyclic nucleus linked in 5-position to the said rhodanine nuclues directly or by means of a methyne bridge having an even number of carbon atoms, such a method being characterized by the fact that a substituent of the alkyl type substituted with a trialkylammonium group is introduced on the N atom of the rhodanine type central nucleus. It further relates to the dyes rendered soluble in low-molecular weight alcohols with the above described method; to the silver halide photographic emulsions containing such dyes; to the photographic elements including such emulsions; and to the photographic images obtained upon development of the said elements.

More specifically, the dyes of the present invention correspond to the following general formulae:

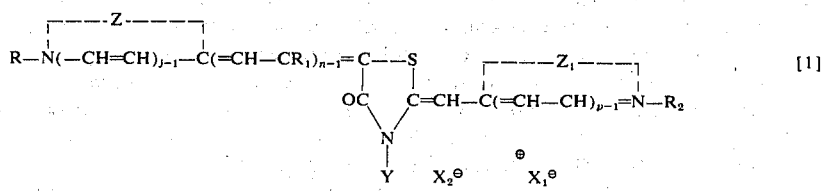

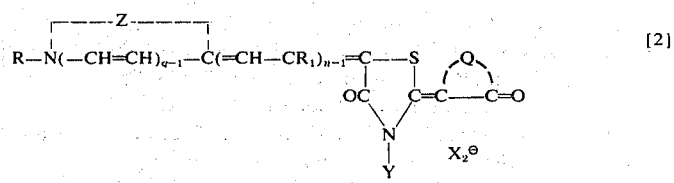

wherein:

R and $R_2$ each represent an alkyl group having from 1 to 8 carbon atoms or a substituted alkyl group, such as methyl, ethyl, propyl, carboxymethyl, carboxyethyl, sulphoethyl, hydroxypropyl, carboxypropyl, γ-sulphobutyl, γ-carboxybutyl, amyl, hexyl, octyl, and so on;

Z and $Z_1$ each represent the non-metallic atoms necessary to complete a 5 or 6 member heterocyclic nucleus such as those of the thiazole series (thiazole; 4-methyl-thiazole; 4-phenylthiazole; 5-methyl-thiazole; 5-phenyl-thiazole; 4,5-dimethylthiazole, 4,5-diphenylthiazole); of the benzothiazole series (benzothaizole; 4-chloro-benzothiazole; 5-chloro-benzothiazole; 6-chloro-benzothiazole; 7-chloro-benzothiazole; 4-methyl-benzothiazole; 5-methyl-benzothiazole; 6-methyl-benzothiazole; 5-bromobenzothiazole; 6-bromo-benzothiazole; 4-phenyl-benzothiazole; 5-phenyl-benzothiazole; 4-methoxy-benzothiazole; 5-methoxy-benzothiazole; 6-methoxy-benzothiazole; 5-methyl-6-methoxy-benzothiazole; 5-iodo-benzothiazole; 6-iodo-benzothiazole; 4-ethoxy-benzothiazole; 5-ethoxy-benzothiazole; 4,5,6,7-tetrahydro-benzothiazole; 5,6-hydroxy-methylen-benzothiazole; 5-hydroxy-benzothiazole; 6-hydroxybenzothiazole; 5,6-dimethyl-benzothiazole, 5,6-dimethoxy-benzothiazole); of the naphtothiazole series ([1,2-d]-naphtothiazole; [2,1-d]-naphtothiazole; 5-methoxy-[1,2-d]-naphtothiazole; 5-ethoxy-[1,2-d]-naphtothiazole; 8-methoxy-[2,1-d]-naphtothiazole; 7-methoxy-[2,1-d]-naphtothiazole); of the oxazole series (4-methyl-oxazole; 5-methyl-oxazole; 4-phenyl-oxazole; 4,5-diphenyloxazole; 4-ethyl-oxazole; 4,5-dimethyl-oxazole; 5-phenyl-oxazole); of the benzoxazole series (5-chloro-benzoxazole; 5-methylbenzoxazole; 5-phenyl-benzoxazole; 6-methyl-benzoxazole; 5,6-dimethyl-benzoxazole; 4,6-dimethyl-benzoxazole; 5-methoxy-benzoxazole; 5-hydroxy-benzoxazole; 6-hydroxy-benzoxazole); of the naphtoxazole series ([2,1-d]-naphtoxazole; [1,2-d]-naphtoxazole); of the selenazole series (4-methyl-selenazole; 4-phenyl-selenazole); of the benzo-selenazole series (benzo-selenazole; 5-chloro-benzoselenazole; 5-methoxy-benzo-selenazole; 5-hydroxy-benzo-selenazole; 6-methoxy-benzo-selenazole; 5,6-dimethoxy-benzo-selenazole); of the napho-selenazole series ([1,2-d]-naphtoselenazole; [2,1-d]-naphtoselenazole); of the thiazoline series (thiazoline; 4-methyl-thiazoline; 4-hydroxy-methyl-thiazoline; 4,4-bis-hydroxymethyl-thiazoline; 4-acethoxy-methyl-4-methyl-thiazoline; 4,4-bis acethoxy-methyl-thiazoline); of the oxazoline series (oxazoline; 4-hydroxy-methyl-4-methyl-oxazoline; 4,4-bis-acethoxymethyl-oxazoline); of the selenazoline series; of the 2-quinoline series (quinoline; 3-methyl-quinoline; 5-methyl-quinoline; 7-methyl-quinoline; 8-methyl-quinoline; 6-chloro-quinoline; 8-chloro-quinoline; 6-methoxy-quinoline; 6-ethoxy-quinoline; 6-hydroxy-quinoline; 8-hydroxy-quinoline); of the 4-quinoline series (quinoline; 6-methoxy-quinoline; 7-methoxy-quinoline; 8-methyl-quinoline); of the 1-iso-quinoline series (iso-quinoline; 3,4-diisoquinoline); of the 3-iso-quinoline series; of the 3,3-dialkyl-indolenine series (3,3-dimethyl-indolenine; 3,3,5-trimethyl-indolenine; 3,3,7-dimethyl-indolenine); of the 2-pyridine series (2-pyridine; 5-methyl-2-pyridine, etc.); of the 4-pyridine series (4-pyridine; 3-methyl-4-pyridine, etc.); of the imidazole series (i.e., imidazole; 1-alkyl-imidazole; 1-alkyl-4-phenyl-imidazole; 1-alkyl-4,5-dimethyl-imidazole, etc.); of the benzimidazole series (i.e., benzimidazole; 1-alkylbenzimidazole; 1-alkyl-5,6-dichloro-benzimidazole; 1-phenylbenzimidazole; 1-hydroxy-ethyl-5,6-dichloro-benzimidazolel 1-ethyl-5-chloro-benzimidazole; 1-acethoxy-ethyl-5,6-dichlorobenzimidazole; 1-ethyl-5-chloro-6-amino-benzimidazole; 1-ethyl-5-chloro-6-bromo-benzimidazole; 1-ethyl-5-acetyl-benzimidazole, etc.).

Q represents the non-metallic atoms necessary to complete a 5 or 6 member ketomethylene nucleus such as those of the 3-thietanone-1,1-dioxyde series (such as 4-methyl-3-thietanone-1,1-dioxyde; 4,4-dimethyl-3-thietanone-1,1-dioxyde, etc.); of the 2-thio-2,4-thiazolindin-dione [rhodanine] (i.e., 3-methylrhodanine; 3-ethyl-rhodanine; 3-propyl-rhodanine; 3-carboxymethyl-rhodanine; 3-carboxy-ethyl-rhodanine; 3-sulpho-propylrhodanine; 3-phenyl-rhodanine; 3-sulpho-phenyl-rhodanine; 3-carboxy-phenyl-rhodanine; 3-N,N-dimethylamino-propyl-rhodanine; 3-N,N-dimethyl-amino-propyl-rhodanine; 3-furfuryl-rhodanine; 3-tetrahydro-furfuryl-rhodanine; 3-α-pyridyl-rhodanine; 3-α-naphtyl-rhodanine; 3-(1-benzothiazolyl)-rhodanine); of the 2,4-thiazolydin-dione series (i.e., 3-methyl-2,4-thiazolydin-dione; 3-carboxy-ethyl-2,4-thiazolydin-dione; etc.); of the thiazolydin-4-one series; of the 2-thiazolydin-4-one series (i.e., 2-methylmercapto-2-thiazolyn-4-one; 2-amino-2-thiazolyn-4-one; 2-diethylamino-2-thiazolyn-4-one; 2-(N-ethyl-N-phenyl-amino)-2-thiazolyn-4-one; etc.); of the 2-thio-2,4-oxazolydin-dione series [thiooxazolydone] (i.e., 3-methyl-2-thio-2,4-oxazolydin-dione; 3-ethyl-2-thio-2,4-oxazolydin-dione; 3-carboxyethyl-2-thio-2,4-oxazolydin-dione; 3-sulpho-butyl-2-thio-2,4-oxazolydin-dione; 3-phenyl-2-thio-2,4-oxazolydin-dione; 3-sulpho-phenyl-2-thio-2,4-oxazolydin-dione; 3-carboxy-phenyl-2-thio-2,4-oxazolydindione; 3-furfuryl-2-thio-2,4-oxazolydin-dione; 3-tetrahydrofurfuryl-2-thio-2,4-oxazolydin-dione); of the 2-imino-2,4-oxazolydin-dione; (i.e., 3-methyl-2-imino-2,4-oxazolydin-dione; 3-sulpho-butyl-2-imino-2,4-oxazolydin-dione; 3-carboxy-propyl-2-imino-2,4-oxazolydin-dione; etc.); of the hexahydro-4,6-dioxo-2-thioxo-pyrimidine series [2-thio-barbituric acid] (e.g., 2-methyl-thio-barbituric acid; 2-ethyl-thio-barbituric acid; 3-sulpho-propyl-2-thio-barbituric acid; 3-phenyl-2-thio-barbituric acid; 3-sulpho-phenyl-2-thio-barbituric acid; 3-carboxyphenyl-2-thio-barbituric acid; 1,3-diethyl-2-thio-barbituric acid; 1,3-disulphophenyl-2-thio-barbituric acid; 1,3-dicarboxy-ethyl-2-thio-barbituric acid; 1-ethyl-3-sulpho-phenyl-2-thio-barbituric acid; etc.); of the hexahydro-2,4,6-trioxo-pyrimidine series; of the 2-thio-2,4-imidazolin-dione [2-thio-idantoine] series (e.g., 3-methyl-2-thio-idantoine; 3-ethyl-2-thio-idantoine; 3-sulpho-ethyl-2-thio-idantoine; 3-sulpho-butyl-2-thio-idantoine; 3-carboxy-methyl-2-thio-idantoine; 3-phenyl-2-thio-idantoine; 3-carboxy-phenyl-2-thio-idantoine; 1,3-diethyl-2-thio-idantoine; 1-phenyl-3-carboxyethyl-2-thio-idantoine; 1-phenyl-3-tetrahydrofurfuryl-2-thio-idantoine; 1-furfuryl-3-carboxy-methyl-2-thioidantoine; etc.); of the 2,4-imidazolydin-dione series; of the 2-imidazolyn-5-one series; of the 2-pyrazolin-5-one (e.g., 1-methyl-2-pyrazolin-5-one; 1-ethyl-2-pyrazolin-5-one; 1-sulphoethyl-2-pyrazolin-5-one; 1-phenyl-2-pyrazolin-5-one; 1-p-sulphophenyl-2-pyrazolin-5-one; 1-phenyl-3-methyl-2-pyrazolin-5-one; 1-p-sulpho-phenyl-3-methyl-2-pyrazolin-5-one; 1-p-sulpho-phenyl-3-methyl-2-pyrazolin-5-one; 1-p-carboxy-phenyl-amino-2-pyrazolin-5-one; 1-butyl-3-anilino-2-pyrazolin-5-one; 1-p-chloro-phenyl-3-phenyl-carbonamido-2-pyrazolin-5-one; 1-(3,5-disulpho)-phenyl-3-methyl-2-pyrazolin-5-one; etc.); of the isoxazolin-5-one series (e.g., 3-methyl-isoxazolin-5-one; 3-ethyl-isoxazolin-5-one; 3-sulphoethyl-isoxazolin-5-one; 3-sulphobutyl-isoxazolin-5-one; 3-carboxy-methyl-isoxazolin-5-one; 3-phenyl-isoxazolin-5-one; etc.); of the 3,5-pyrazolidin-dione series (e.g., 1,2- dimethyl-3,5-pyrazolidin-dione; 1-methyl-2-ethyl-3,5-pyrazolidin-dione; 1,2-diphenyl-3,5-pyrazolidindione; 1-phenyl-2-methyl-3,5-pyrazolidin-dione, etc.); of the 1,3-diketo-hydrindene series; of the 1-hyndanone series; of the 2-hyndanone series; of the α-cumaranone series; of the β-cumaranone series; of the thio-hyndoxyle-(β-oxy-thio-naphtene) series; of the thio-naphten-2-one series; of the hyndoxyle series (2,3-didi-dro-3-keto-indole); of the oxindole series (2,3-dididro-2-keto-indole); of the pyrrolidone series (e.g., 1-ethyl-pyrrolidone series; 1-methyl-2-ethyl-pyrrolidone; 1,3-diethyl-pyrrolidone, etc.); of the pyperidone series; of the 3,4-dihydroquinolin-2-one series; of the phen-morpholin-2-one, phen-morpholin3-one, 1,3-cyclo-pentan-dione, 1,3-cyclo-hexan-dione, benzo-(1,4)-thiazin-3-one, benzo-(1,4)-thiazin-2-one, etc. series. $R_1$ represents a hydrogen atom, an alkyl group, such as for instance methyl, ethyl, propyl, butyl, etc.; or an aryl group, such as for instance phenyl, tolyl; or an alkoxy group, such as methoxy, ethoxy, propoxy; or an alkyl-thio group, such as methylthio, ethyl-thio, propyl-thio; etc.

J, p. q represent 1 and 2.

n can be 1,2,3,4.

$X_1^\ominus$ represents an acid anion such as for instance bromide, iodide, chloride, perchlorate, sulphonate, thiocyanate, p-toluensulphonate, benzenesulphonate, methyl-sulphate, ethyl-sulphate, etc.

Y represents a group of the following formula:

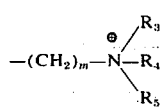

wherein:

m is an entire number, and precisely 2,3,4;

$R_3$, $R_4$, $R_5$, equal or different, each represent an alkyl group having from 1 to 6 carbon atoms, such as methyl, ethyl, propyl, butyl, anyl, hexyl.

$X_2^\ominus$ is an acid anion having the same meaning as $X_1^\ominus$.

The dyes of the formula [1] can be prepared by reacting a merocyanine of the formula:

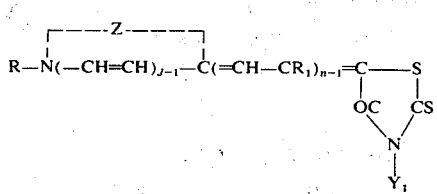

[3]

wherein:

R, J. Z, $R_1$, have the above mentioned meanings;

$Y_1$ is a group of the following formula:

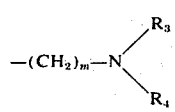

wherein:

m, $R_3$, $R_4$ have the above mentioned meanings, with salifying agents of the dimethyl-sulphate, diethyl-sulphate or p-toluen-sulphonate type in excess (i.e., in a higher quantity that 2 gram-moles per 1 mole of mer-ocyanine), in absence of a reaction solvent and by further reaction of the quaternary salts, thus obtained, with a compound of the following formula:

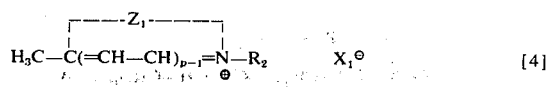

[4]

wherein:

$Z_1$, $R_2$, $X_1$ and p have the above mentioned meanings, preferably heating the reacting product in a suitable solvent, such as for instance methyl, ethyl, propyl alcohol in the presence of a basic condensating agent, such as for example trialkyl-amines (e.g., triethyl-amine, tributyl-amine); dialkyl-anilines (e.g., N,N-dimethyl-aniline; N,N-diethyl-aniline); tertiary heterocyclic amines (e.g., pyridine; quinoline; N-alkyl-pyperidine); alcoholates of alkyl metals (e.g., sodium methylate, sodium ethylate).

The dyes of formula [2] can be advantageously prepared by reaction of a compound of formula [3] with salifying agents of the dimethyl-sulphate, diethyl-sulphate or p-toluen-sulphate type in excess (i.e., in a higher quantity than 2 gram-moles per 1 mole of merocyanine), in absence of solvents and by further reaction of the quaternary salts, thus obtained, with compounds of the following general formula:

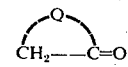

[5]

wherein:

Q has the above mentioned meaning.

The above described condensation can be carried out in an inert solvent in presence of a basic condensating agent, as formerly described, and refluxing the reaction mixture.

The dyes of formula [3], wherein n=1, are prepared by reaction of a quaternary salt of formula:

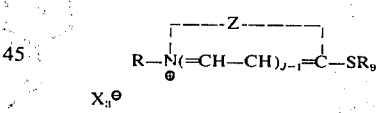

[6]

wherein:

R,Z,J have the above mentioned meanings;

$R_9$ is a low-molecular weight alkyl group, such as methyl, ethyl, propyl, and $X_3^\ominus$ is an anion like $X_1^\ominus$ and $X_2^\ominus$, with an intermediate compound of formula:

[7]

wherein:

$Y_1$ has the above meaning, in an inert solvent, preferably in presence of a basic condensating agent, such as for instance those described above, by heating the reaction mixture up to boiling.

The dyes of formula [3], wherein n can be 2,3,4, are advantageously prepared by reaction of a quaternary salt of formula:

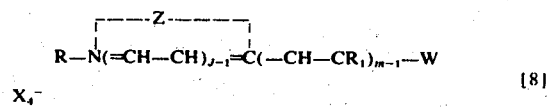

wherein:

W represents a group —SR$_6$, wherein R$_6$ is a low-molecular weight alkyl group (such as for instance methyl, ethyl, propyl); or a halogen atom (such as chlorine, bromine), or a group:

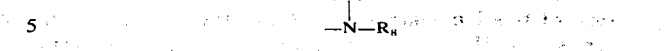

wherein:

R$_7$ is a hydrogen atom, an alkyl group (such as methyl, ethyl, propyl) or an acyl group of a carboxylic acid;

R$_8$ is an aryl group (such as phenyl);

and X$_4^\ominus$ is an anion like for instance X$_1^\ominus$, X$_2^\ominus$ and X$_3^\ominus$, with a compound of general formula [7].

The dyes of the present invention are for instance the following:

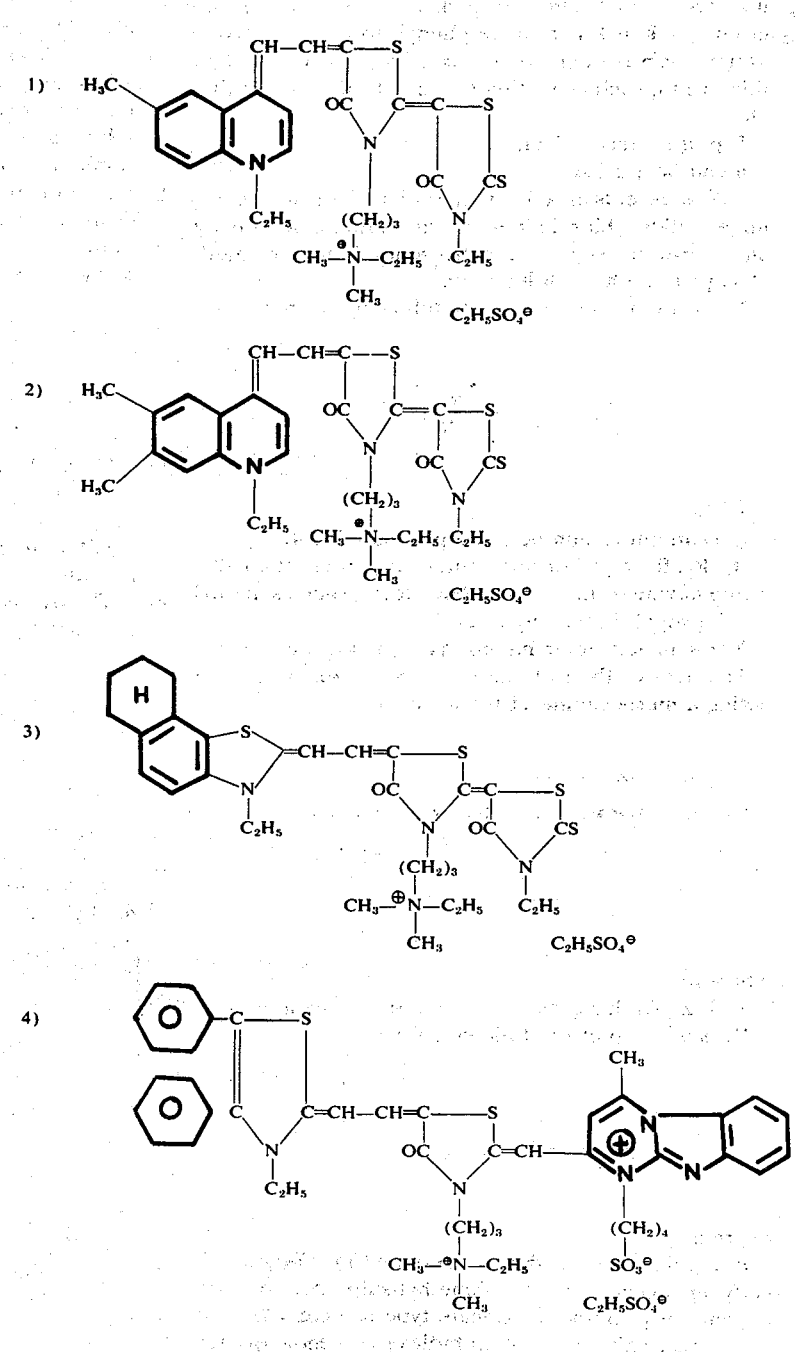

5) 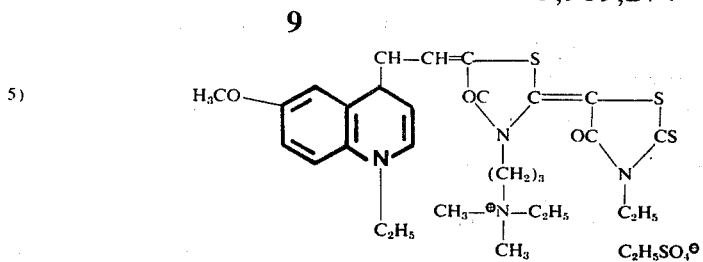
6) 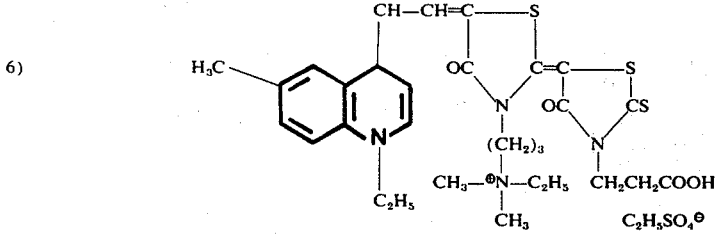
7) 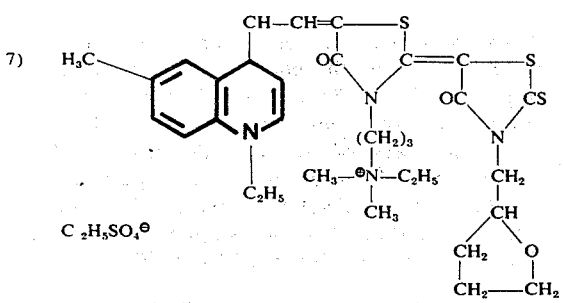
8) 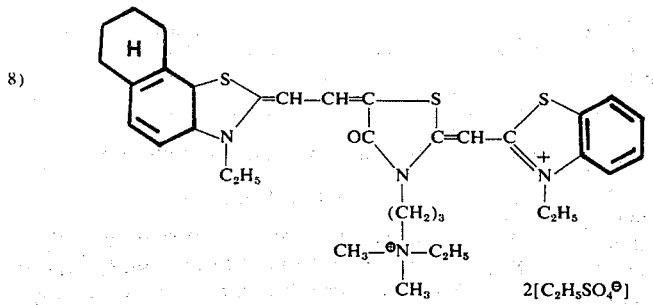
9) 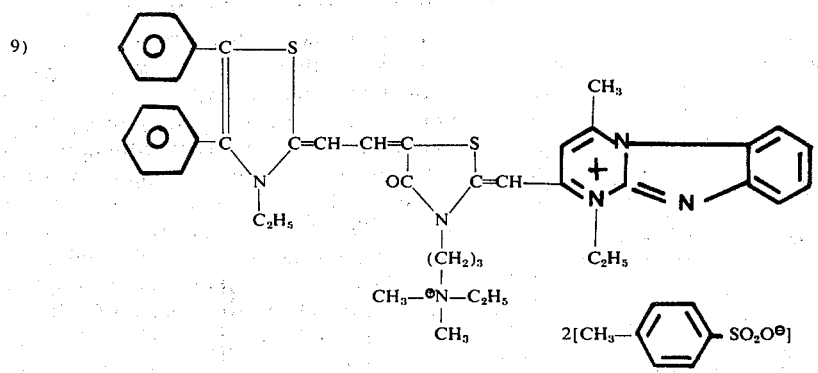
The above described dyes have been compared with the following dyes known in the prior art (German Pat. No. 1,098,653; U.S. Pat. No. 2,454,629; U.S. Pat. No. 3,335,010):
| Centesimal analysis: | Calculated | Found |
|---|---|---|
| C% | 60.89 | 60.66 |
| N% | 8.49 | 9.56 |
| H% | 5.09 | 5.26 |
| S% | 19.4 | 19.4 |
A) 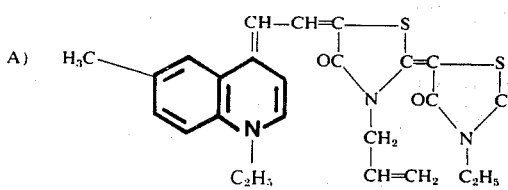
B) 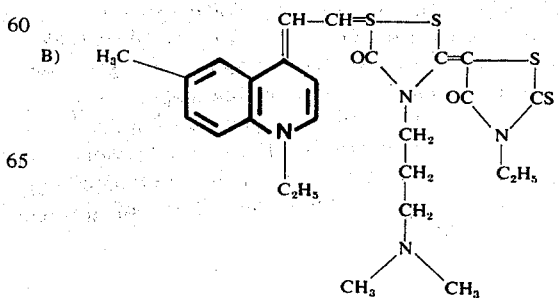

| Centesimal analysis: | Calculated | Found |
|---|---|---|
| C% | 59.94 | 59.46 |
| N% | 10.36 | 10.34 |
| H% | 5.96 | 5.92 |
| S% | 17.79 | 17.73 |

C)

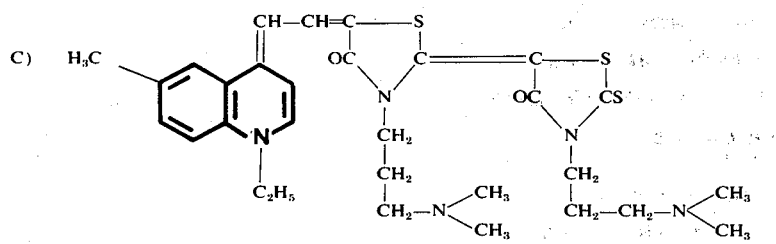

| Centesimal analysis: | Calculated | Found |
|---|---|---|
| C% | 60.25 | 60.12 |
| N% | 11.72 | 11.82 |
| H% | 6.57 | 6.61 |
| S% | 16.10 | 16.27 |

The dyes of the present invention have been prepared in the following way:

EXAMPLE 1

3[(3-dimethyl-ethyl-ammonium-ethyl-sulphate)-propyl]-2-(3-ethyl-4-oxo-2-thioxothiazolidin-5-ylidene)-[(1-ethyl-6-methylquinolin-4-ylidene)-ethylidene]-4-thiazolidone 8 g. of 3-(3-dimethylamino-propyl)-5[(1-ethyl-6-methyl-quinolin-4-ylidene)-ethylidene]-rhodanine (prepared as described in U.S. Pat. No. 3,384,486) and 20 cc. of ethyl sulphate were heated up to 100°C for 10'. The product, thus obtained, was cooled with water and ice, then washed twice with anhydrous ethyl ether and reacted with 3.8 g. of N-ethyl-rhodanine in 150 cc. of absolute ethyl alcohol and 15 cc. of triethylamine refluxing the reaction mixture for 20'. The mixture was then cooled and the raw dye collected in a buckner. The raw dye was then crystallized using absolute ethyl alcohol as a solvent which contained diethyl sulphate, thus obtaining 3 g. of the dye as green crystals with gilt reflections.

M.P. 282°–284°C with decomposition.
λmax. of absorption in ethanol 664 nm.

| Centesimal analysis: | Calculated | Found |
|---|---|---|
| N% | 8.23 | 8.06 |
| S% | 18.68 | 18.41 |

EXAMPLE 2

3[(3-dimethyl-ethyl-ammonium-ethyl-sulphate)-propyl]-2-(3-ethyl-4-oxo-2-thioxo-thiazolidin-5-ylidene)-5-[(1-ethyl-6,7-dimethyl-quinolin-4-ylidene)-ethylidene]-4-thiazolidone 4.2 g. of 3(3-dimethylamino-propyl)-5[1-ethyl-6,7-dimethyl-quinolin-4-ylidene)-ethylidene]-rhodanine (prepared as described in U.S. Pat. No. 3,384,486) and 15 cc. of diethylsulphate were heated up to 100°C for 15'. The pitch product, thus obtained, was cooled with water and ice and washed many times each with 50 cc. of ethyl ether till a solid product was obtained. The product, thus obtained, was dried in a desicator under vacuum at a room temperature and then reacted with 1.8 g. of N-ethyl-rhodanine using 75 cc. of absolute ethyl alcohol as a reaction solvent, 7.5 cc. of triethylamine and heating the mixture up to its boiling point for 5'. The mixture was cooled for one night in a cooler and the raw dye, thus obtained, was collected in a buckner and washed with absolute ethyl alcohol (50 cc) and with 200 cc. of ethyl ether. The raw dye was crystallized from absolute ethyl alcohol containing acetic anhydride and diethyl sulphate, thus obtaining 1.2 g. of the dye melting at 253°–255°C.

| Centesimal analysis: | Calculated | Found |
|---|---|---|
| N% | 7.89 | 7.70 |
| S% | 18.32 | 18.10 |

λmax. of absorption in ethanol = 665 nm.

EXAMPLE 3

3[(3-dimethyl-ethyl-ammonium-ethylsulphate)-propyl]-2-(3-ethyl-4-oxo-2-thioxo-thiazolidin-5-ylidene)-5-[(1-ethyl-α-tetrahydro-naphtho-thiazolin-2-ylidene)-ethyliden]-2-thiazolidone 10 g. of 2(ω-acetanilide-vinyl)-α-tetrahydro-naphthothiazole iodo-ethylate, 6 g. of N-(γ-dimethylamino-propyl)rhodanine perchlorate, 50 cc. of anhydrous pyridine and 5 cc. of triethylamine were refluxed for two hours. A red-violet crystalline solid was separated by cooling the mixture and this solid then crystallized from 1,250 cc. of ethanol, thus obtaining 6.2 g. of 3(3-dimethyl-aminopropyl)-5-[1-ethyl-α-tetrahydro-napho-thiazolin-2-ylidene]-rhodanine, melting at 207°–209°C., 2.29 g. of such a merocyanine and 12 cc. of diethylsulphate were heated for 2' on a free flame till a complete solution was reached. The pitch product, thus obtained, was cooled and washed many times with ethyl ether, it was then reacted with 0.8 g. of N-ethyl-rhodanine, 40 cc. of absolute ethyl alcohol and 14 cc. of triethylamine and refluxed for 15'.

The dye was separated by cooling the mixture, it was then filtered, washed with ether and crystallized from absolute ethyl alcohol, thus obtaining 0.6 g. of a pure dye melting at 275°–276°C.

| Centesimal analysis: | Calculated | Found |
|---|---|---|
| N% | 7.60 | 7.63 |
| S% | 21.72 | 21.71 |

λmax. of absorption in ethanol = 582 nm.

EXAMPLE 4

3[(3-dimethyl-ethyl-ammonium-ethyl-sulphate)-propyl]-2-[(1-γ-sulphobutan-4-methyl-pyrimido-[1,2-a]-benzimidazole)-2-methylen]-5-(1-ethyl-4,5-diphenyl-thiazolin-2-ylidene)-ethyliden]-4-thiazolidone.

7.64 g. of 2-ω-phenyl-imino-ethylidene-3-ethyl-4,5-diphenyl-thiazole, 6.34 g. of N-(γ-dimethylamino-propyl)rhodanine perchlorate 10 cc. of pyridine, 3 cc. of triethylamine and 2.5 cc. of acetic anhydride were refluxed for 5'. A pitch product was separated by cooling the mixture, then hardened by boiling in water and crystallized from ethanol, thus obtaining 6.67 g. of a merocyanine melting at 229°–234°C.

2.1 g. of this merocyanine and 10 cc. of diethylsulphate were boiled for 4', then cooled in water and 1.3 g. of 2,4-dimethylpyrimide-[1,2-a]-benzimidazole-buthan-sultone and 30 cc. of absolute ethyl alcohol added thereto. The mixture was heated up to the boiling temperature and 3 cc. of triethylamine added thereto. The mixture was heated for further 30'. The cyan solution, thus obtained, was cooled in water and ice and the dye precipitated with ether. The pitch, thus obtained, was boiled in water till it was converted into a solid pulverulent product. The raw product was boiled many times in ethyl acetate and crystallized from absolute ethyl alcohol containing diethylsulphate, thus obtaining 0.68 g. of a dye melting at 230° C. with decomposition.

λmax. of absorption in ethanol = 649 nm.

EXAMPLE 5

3[(3-dimethyl-ethyl-amonium-ethyl-sulphate)-propyl]-2-(3-ethyl-4-oxo-2-thioxo-thiazolidin-5-ylidene)-5-[(1-ethyl-6-methoxyquinolin-4-ylidene)-ethylidene]-4-thiazolidone 14.8 g. of 4-(ω-acetanilide-vinyl)-6-methoxyquinolineiodo-ethylate, 9.8 g. of N-(γ-dimethylaminopropyl)-rhodanine perchlorate, 115 cc. of absolute ethyl alcohol and 10.5 cc. of triethylamine were refluxed for 30'. The dye was collected in a buckner and washed with ethyl ether, thus obtaining 11.7 g. of a dye as dark green crystals.

4.2 g. of this merocyanine and 23 cc. of diethylsulphate were heated up to 125° C. for 17', thus obtaining a pitch-like product which, after cooling, was hardened by repeated washings with ethyl ether. The product, thus obtained, 1.6 g. of N-ethyl-rhodanine, 75 cc. of absolute ethyl alcohol and 7 cc. of triethylamine were refluxed for 5'. By cooling the mixture at a room temperature during one night, the raw dye was separated and then crystallized from absolute ethyl alcohol containing diethylsulphate. 1.3 g. of a dye were obtained. M.P. 271°–273° C.

λmax. of absorption in ethanol = 673 nm.

EXAMPLE 6

3[(3-dimethyl-ethyl-ammonium-ethylsulphate)-propyl]-2-(3-carboxyethyl-4-oxo-2-thioxo-thiazolidin-5-ylidene)-5-[(1-ethyl-6-methylquinolin-4-ylidene)-ethylidene]-4-thiazolidone The dye was prepared as described in Example 1 using N-carboxy-ethyl-rhodanine instead of N-ethyl-rhodanine. The raw dye was crystallized from a mixture of methyl alcohol, acetic anhydride and diethyl-sulphate, thus obtaining a pure dye melting at 205°C with decomposition.

λmax. of absorption in ethanol = 669 nm.

EXAMPLE 7

3[(3-dimethyl-ethyl-ammonium-ethyl-sulphate)-propyl]-2-(3-tetrahydro-furfuryl-4-oxo-2-thioxo-thiazolidin-5-ylidene)-5-[(1-ethyl-6-methyl-quinolin-4-ylidene)-ethyliden]-4-thiazolidone 4.13 g. of 3(3-dimethylamine-propyl)-5-[(1-ethyl-6-methyl-quinolin-4-ylidene)-ethylidene]-rhodanine (see the dye of Example 1) and 10 cc. of diethyl-sulphate were heated up to 100°C for 10'. After cooling, 75 cc. of absolute ethyl alcohol, 7.5 cc. of triethylamine and 2.17 g. of N-tetrahydrofurfurylrhodanine (Example No. 5 of patent application No. 48,919A/71, filed in Italy on Mar. 9, 1971 by the applicant) were added thereto and the mixture, thus obtained, was then refluxed for 20'. It was then left to stand for one night; the raw product, thus obtained, was filtered and further crystallized from 650 cc. of absolute alcohol containing diethyl-sulphate (0.5 cc.), thus obtaining 2.7 g. of pure dye melting at 262-264°C.

| Centesimal analysis: | Calculated | Found |
|---|---|---|
| N% | 7.57 | 7.46 |
| S% | 17.10 | 17.03 |

λmax. of absorption in ethanol = 668 nm.

EXAMPLE 8

3-[(3-dimethyl-ethyl-ammonium-ethyl-sulphate)-propyl]-2-[(3-ethylbenzothiazole-ethyl-sulphate)-2-methylen]-5-[(1-ethyl-α-tetrahydro-naphtho-thiazolin-2-ylidene)-ethylidene]-4-thiazolidone 2.29 g. of 3-(3-dimethylamino-propyl)-5-[(1-ethyl-α-tetrahydro-naphtothiazolin-2-ylidene)-ethylidene]-rhodanine (prepared like the dye described in Example No. 3) and 12 cc. of diethylsulphate were heated up to boiling for 2'. The product, thus obtained, was cooled and then washed with ethyl ether many times; 1.5 g. of 2-methyl-benzo-thiazole-ethylsulphate, 40 cc. of absolute ethyl alcohol and 4 cc. of triethylamine were then added thereto. The mixture, thus obtained, was then refluxed for 45' and the raw dye was separated by cooling the whole. The raw dye was then washed many times with a mixture of ethyl alcohol/ethyl ether in a ratio of 1:1. The dye was further purified by boiling it in ethyl acetate. It was then dried, thus obtaining a pure dye melting at 267-271°C.

λmax. of absorption in ethanol = 610 nm.

EXAMPLE 9

3[(3-dimethyl-ethyl-ammonium-p-toluen-sulphonate)-propyl]-2-[1-ethyl-4-methyl-pyrimido-[1,2-a]-benzimidazole-p-toluensulphonate)-2-methylen]-5-[(1-ethyl-4,5-diphenyl-thiazolin-2-ylidene)-ethylidene]-4-thiazolidone 4.5 g. of 3-γ-dimethylamino-propyl-5[1-ethyl-4,5-diphenyl-thiazolidin-2-ylidene)-ethylidene]-rhodanine, prepared like the dye of Example 4, were reacted with 2.2 g. of ethyl p-toluen-sulphonate by heating up to 150°C. for 35'.

1.9 g. of 2,4-dimethyl-pyrimido-[1,2-a]-benzimidazole and 2.2 g. of ethyl p-toluen-sulphonate were reacted at 150°C for 35'. The two salts, thus obtained, were dissolved in 30 cc. of boiling ethyl alcohol, 3 cc. of triethylamine were added thereto and further reacted for 30'by heating the mixture up to its boiling point. The mixture was then cooled and the dye precipitated with ethyl ether. A gummy pitch product was separated and then hardened with repeated treatments with ethyl acetate. The raw dye was finally crystallized from methyl alcohol, thus obtaining 0.08 g. of a pure dye melting at 218°–224°C with decomposition.

λmax. of absorption in ethanol = 640 nm.

Our dyes can be favorably used to sensitize silver halides optically, such as for instance silver chloride, silver bromide, silver iodide, silver bromo-chloride, silver bromoiodide, silver chloro-bromo-iodide, etc. dispersed in every hydrophilic colloid useful to produce light-sensitive photographic emulsions. Useful hydrophilic colloids can include natural materials, such as for instance gelatin, albumin, agar-agar, gum-arabic, alginic acid, etc. and synthetic materials, such as polyvinylic alcohol, polyvinylpyrrolidone, cellulose ethers, partially hydrolized cellulose acetate.

The concentration of our dyes in the emulsion can vary widely, for instance from 5 to some 100 mgr. per 1 liter of emulsion and the specific concentrations depend from the dye used, from the sensitive material type and from the particular effect desired.

The most favorable dye concentration can be easily determined for each emulsion by making different concentration series and further measuring the sensitivity of the corresponding emulsions with means known to the man skilled in the art.

As reminded previously, our dyes can be easily soluble in low-molecular weight alcohols, such as for instance methyl and ethyl alcohols.

The silver halide colloidal emulsions can be usefully spectrally sensitized by adding the suitable dye quantity in alcoholic solution to the emulsion under a sufficient stirring to assure a uniform distribution of the dye in the emulsion.

The above mentioned silver halide photographic emulsions, containing the dyes of the present invention, can further contain chemical sensitizers, such as for instance labile sulphur sensitizers (viz. allyl-thiocarbamide, thiourea, allylthioisocyanate, cystine), various gold derivative compounds (viz. potassium chloroaurate, gold trichloride), various palladium derivative compounds (viz. palladium chloride, potassium chloropalladate), or mixtures thereof; antifogging compounds, such as benzotriazoles, nitrobenzenimidazoles, 5-nitro-indazole or mixtures thereof; hardeners, such as formaldehyde, chrom allumen, dibromoacroleine, mucochloric or mucobromic acid or mixtures thereof; couplers like those described for instance in our Italian patent applications Nos. 37,798A/69 and 54,921A/71 introduced into the emulsion by the solvent dispersion technique by means of substantially water-immiscible organic solvents of the dibutylphthalate, tricresylphosphate, dibutylformamide type, as describwd in our Italian patent application No. 26,077A/70. Such emulsions can be favorably coated on every base used to prepare photographic elements, such as for instance paper, glass, cellulose acetate, cellulose nitrate, synthetic resins, like polyesters and polyamides.

EXAMPLE 10

The sensitizing dyes of the present invention were dissolved in methyl alcohol toluolated (concentration 1 g./3,000 cc. of the solvent) and further added each to a photographic emulsion of the same composition, containing 91.5% moles of AgCl and 8.5% moles of AgBr. The dyes were uniformly incorporated into the emulsion under stirring. After a short digestion, the emulsions were coated on a cellulose triacetate base, dried, exposed to a ZEISS type spectrograph and finally developed for 5' at 18°C with Ferrania R6 type developer containing:

| | |
|---|---|
| methol | 1 g. |
| sodium sulphite anhydrous | 25 g. |
| hydroquinone | 3.5 g. |
| sodium carbonate anhydrous | 25 g. |
| potassium bromide | 0.75 g. |
| water to make | 1000 cc. |

Table 1 shows the sensitization maxima and limits expressed in nm of the various dyes.

TABLE 1

| Compound | Sens. max. | Sens. limits |
|---|---|---|
| dye 1 | 700 | 580–745 |
| dye 2 | 700 | 585–745 |
| dye 3 | 635–640 | 560–730 |
| dye 4 | 675 | 580–735 |
| dye 5 | 710 | 630–745 |
| dye 6 | 705 | 620–740 |
| dye 7 | 710 | 620–740 |
| dye 8 | — | 580–740 |
| dye 9 | 680 | 585–720 |

EXAMPLE 11

The dyes A, B and C outside the present invention have been compared with the dye of Example 1 of the present invention as far as the solubility in low-molecular weight alcohols, such as methyl and ethyl alcohols, is concerned. It turned out from the examination of the solubility that only the dye 1 of the present invention could be completely dissolved in ethyl alcohol (1 g./4,000 cc.) and in methyl alcohol (1 g./2,000 cc.), while the dyes A, B, C, outside the present invention could not be completely dissolved in low-molecular weight alcohols, such as methyl and ethyl alcohols even if strong dilutions (1 g./50,000 cc.) were used.

As what is said above, it can be concluded that the only dye of Example 1 of the present invention can be introduced into the photographic emulsion after the dye itself has been dissolved in low-molecular weight alcohols, such as ethyl and methyl alcohols.

The dyes B and C were also dissolved in H$_2$O containing a strong acid equivalent (HCl) but after few hours the solutions exhibited a change in their colorations or a strong decrease in their optical density.

EXAMPLE 12

The dye of Example 1 of the present invention was dissolved in methyl alcohol toluolate (conc. 1g./3,000 cc.) and an optimal quantity thereof added to a photographic emulsion containing 80% moles of AgBr and 20% moles of AgCl, a dispersion of a cyan coupler of the type of those described in Italian patent application No. 37,798A/69, a stabilizer of the type of those in British Pat. No. 508,073 and a hardener of the type of those described for instance in U.S. Pat. No. 1,763,533.

The emulsion was coated on a paper base, exposed through a step wedge and in a ZEISS type spectrograph and finally developed with a color developer of the p-phenylene diamine type.

Table 2 shows the sensitization maxima and limits, the fog values corresponding to different incubations of the virgin material compared with the fog value obtained by exposing and developing the specimens just after the coating.

TABLE 2

| sens. max. | sens. limits | fog | incubations |
|---|---|---|---|
| 710 | 590–740 | 0.6 | fresh |
| — | — | 0.5 | 7 days on a shelf |
| — | — | 0.5 | 7 days at 50°C 20% RH |
| — | — | 0.5 | 7 days at 38°C 80% RH |

What we claim is:

1. A silver halide photographic emulsion characterized by the fact that the emulsion contains at least one low-molecular weight alcohol soluble trinuclear dye corresponding to the general formula:

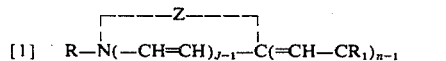

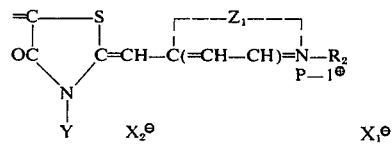

or

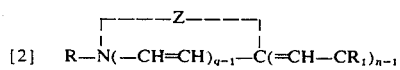

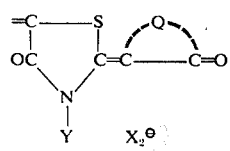

wherein:

Z and $Z_1$ each represent the non-metallic atoms necessary to complete a 5 or 6 member heterocyclic nucleus;

Q represents the non-metallic atoms necessary to complete a 5 or 6 member Kelomethylene nucleus;

R and $R_2$ each represent a substituted or not substituted alkyl group having from 1 to 8 carbon atoms;

$R_1$ represents a hydrogen atom or an alkyl group;

J, p, q represent 1 and 2;

n represents 1, 2, 3 and 4;

$X_1^-$ and $X_2^-$ represent an acid anion; and

Y represents a group having the following formula:

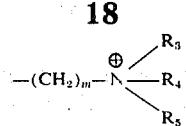

wherein:

$R_3$, $R_4$, $R_5$ equal or different, each represent an alkyl group having from 1 to 6 carbon atoms, and m represents 2, 3 and 4.

2. A silver halide photographic emulsion characterized by the fact that the emulsion contains at least one low molecular weight alcohol soluble trinuclear dye corresponding to the general formula:

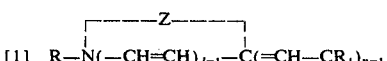

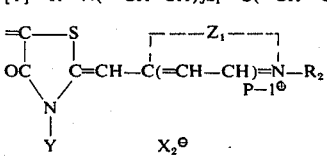

or

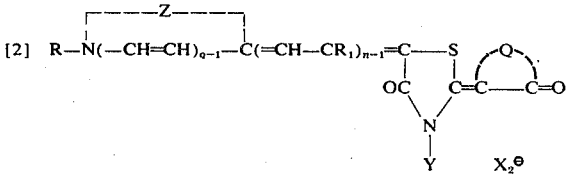

wherein:

Z and $Z_1$ each represent the non-metallic atoms necessary to complete a 5 or 6 membered heterocylic nucleus of the thiazole, benzothiazole, naphtothiazole, oxazole, benzoxazole, naphtoxazole, selenazole, benzoselenazole, naphtoselenazole, thiazoline, oxazoline, selenazoline, 2-quinoline, 4-quinoline, 1-iso-quinoline, 3-iso-quinoline, 3,3,-dialkylindolenine, 2-pyridine, 4-pyridine, imidazole and benzimidazole series; and Q represents the non-metallic atoms necessary to complete a 5 or 6 membered ketomethylene nucleus of the 3-thietanone-1,1-dioxide, rhodanine, 2,4-thiazolin-dione, 2-thiazolin-4-one, thio-oxazolidone, 2-imino-2,4-oxazolin-dione, 2-thio-barbituric acid, hexahydro-2,4,6-trioxopyrimidine, 2-thio-idantoine, 2,4-imidazolin-dione, 2-imidazolin-5-one, 2-pyrazolin-5-one, isoxazolonin-5-one, 3,5-pyrazolidin-dione, 1,3-diketoidrindene, 1-indanone, 2-indanone, α-cumaranone, β-cumaranone, thioindoxile, thionaphten-2-one, indoxile, oxy-indole, pyrrolidone, pyperidone, 3,4-dihydroquinolin-2-one, phen-morpholin-2-one, phen-morpholin-3-one, 1,3-cyclopenthan-dione, 1,3-cyclo-hexan-dione, benzo-(1,4)-thiazin-3-one, benzo(¼)-thiazin-2-one series.

R and $R_2$ each represent a substituted or not substituted alkyl group having from 1 to 8 carbon atoms;

$R_1$ represents a hydrogen atom or an alkyl group;

J, p, q represent 1 and 2;

n represents 1,2,3 and 4;

$X_1^-$ and $X_2^-$ represent an acid anion; and

Y represents a group having the following formula:

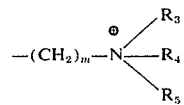

wherein:

$R_3$, $R_4$, $R_5$, equal or different, each represent an alkyl group having from 1 to 6 carbon atoms, and m represents 2, 3 and 4.

3. A photographic element comprising a base and at least one silver halide emulsion layer characterized by containing at least one emulsion layer of claim 1.

4. A photographic element comprising a base and at least one silver halide emulsion layer characterized by containing at least one emulsion layer of claim 2.

* * * * *

UNITED STATES PATENT OFFICE
CERTIFICATE OF CORRECTION

PATENT NO. : 3,909,274
DATED : September 30, 1975
INVENTOR(S) : Paolo Beretta and Luigi Magnani It is certified that error appears in the above-identified patent and that said Letters Patent are hereby corrected as shown below:

Col. 17, Claim 1, line 60, "kelomethylene" should be

-- ketomethylene --.

Signed and Sealed this thirtieth Day of December 1975

[SEAL]

Attest:

RUTH C. MASON
Attesting Officer

C. MARSHALL DANN
Commissioner of Patents and Trademarks